United States Patent [19]

Chapman

[11] Patent Number: 4,989,823
[45] Date of Patent: Feb. 5, 1991

[54] SHOCK AND VIBRATION ISOLATOR

[75] Inventor: Leonard T. Chapman, North Hollywood, Calif.

[73] Assignee: Leonard Studio Equipment, Inc., North Hollywood, Calif.

[21] Appl. No.: 345,108

[22] Filed: Apr. 28, 1989

[51] Int. Cl.⁵ ............................................... B60N 1/08
[52] U.S. Cl. ................................... 248/638; 248/913; 248/178
[58] Field of Search ............... 248/636, 638, 562, 657, 248/184, 798, 913, 580, 287, 285, 178, 661, 178, 298; 108/143; 267/150, 169

[56] References Cited

U.S. PATENT DOCUMENTS

| 1,793,801 | 2/1931 | Hinckley | 248/657 X |
| 2,833,597 | 5/1958 | Sloyan | 248/657 X |
| 4,325,133 | 4/1982 | Reitmayer | 248/638 X |
| 4,408,744 | 10/1983 | Thompson | 248/636 |
| 4,596,373 | 6/1986 | Omi et al. | 248/562 |

FOREIGN PATENT DOCUMENTS 1300101  3/1987  U.S.S.R. ............................. 248/638

Primary Examiner—Alvin C. Chin-Shue
Attorney, Agent, or Firm—Lyon & Lyon

[57] ABSTRACT

A shock and vibrations isolator having a support plate with opposing ferrules slidably mounted on spaced apart guide bars. The guide bars have a slight radius of curvature in a plane perpendicular to the plane of the support plate. The radius of curvature is selected to be collinear with the direction of the shocks. Springs are provided to bias the support plate to a lateral center position. A mounting plate disposed over the support plate is slidably attached to spaced apart guide rails. The mounting plate is also biased towards a longitudinal center position by springs. The ends of the guide rails and the ends of the guide bars are joined at connecting blocks.

19 Claims, 3 Drawing Sheets

SHOCK AND VIBRATION ISOLATOR

BACKGROUND OF THE INVENTION

The field of the present invention is shock and vibration isolators. More particularly, the invention relates to an isolator for isolating a device or instrument from shock and/or vibration occurring during movement of the instrument.

During filming sequences with a motion picture or video tape camera, it is often necessary for the camera to be moved in space over a floor or supporting surface. For proper filming, the camera movement must be accomplished smoothly. Even small amounts of shock or vibration of the camera can result in unsatisfactory filming due to shaky or erratic recorded images. Consequently, it is necessary to provide a steady platform for the camera by isolating the camera from shock and vibration.

The prior art isolators have various disadvantages. In some instances, specific weights or counterweights must be added to provide balancing and to compensate for the weight of the camera. Other known isolators can handle only cameras in specific weight ranges. In addition, highly trained and experienced camera operators may be required especially with operator carried systems. In addition, certain of these known isolators are mechanically complex, expensive, and difficult to use.

Commonly, a motion picture or video camera is mounted on an extendable elevation arm of a wheeled dolly to facilitate camera movement and angle changes, as required by the filming sequence. As the dolly wheels roll over the supporting or floor surface, irregularities (for example cracks, bumps, depressions, debris particles, etc.) generate shock and/or vibration which can be transmitted through the structure of the dolly to the camera. These transmitted mechanical impulses degrade steady filming ability. Since the camera may be elevated substantially above the surface on the dolly arm, the effects of a small crack or bump in the floor surface are amplified at the camera position.

SUMMARY OF THE INVENTION

The present invention is directed to a shock and vibration isolator which prevents shock and vibration generated by movement from disturbing a steady platform. To this end, first and second guide bars slidably extend through ferrules of a support plate. Guide rails are linked at their ends to the guide bars. A mounting plate having ferrule arms is slidably mounted on the guide rails. Biasing means or springs are provided for biasing the support plate to its lateral center position, and for biasing the mounting plate towards a center longitudinal position. The guide bars have a radius of curvature in a plane perpendicular to the plane of the support plate.

Preferably, the guide bars and guide rails are connected at their ends to connecting blocks. Adjustable friction clamps are advantageously included to vary the sliding friction between the support plate and guide bars, and the mounting plate and guide rails. The adjustable friction clamps may include a lever fixed to a drive stud threadably engaged through a boss, a clamp band overlying a friction sleeve partially surrounding the guide bar, and a stud having an end engageable to the clamp band. Actuation of the lever causes the stud end to reversibly clamp band and sleeve around the guide bar to vary the amount of sliding friction. In a preferred embodiment, the clamp band includes a slot and a relieved section opposite to the slot.

Preferably, the support plate has ferrules disposed at opposite ends thereof with spaced apart self-aligning ball bushings disposed within the ferrules and surrounding the guide bars.

Accordingly, it is an object of the present invention to provide a shock and vibration isolator for isolating a steady platform from mechanical disturbances.

It is a further object of the invention to provide a vibration isolator which effectively provides isolation regardless of the weight of the instrument or device mounted upon the steady platform.

It is a further object of the invention to provide an isolator adaptable for use on a camera dolly. Other and further objects and advantages will appear hereinafter.

BRIEF DESCRIPTION OF THE DRAWINGS

In the drawings,, wherein similar reference characters denote similar elements throughout the several views.

DETAILED DESCRIPTION OF THE PREFERRED EMBODIMENT

Figure 1:
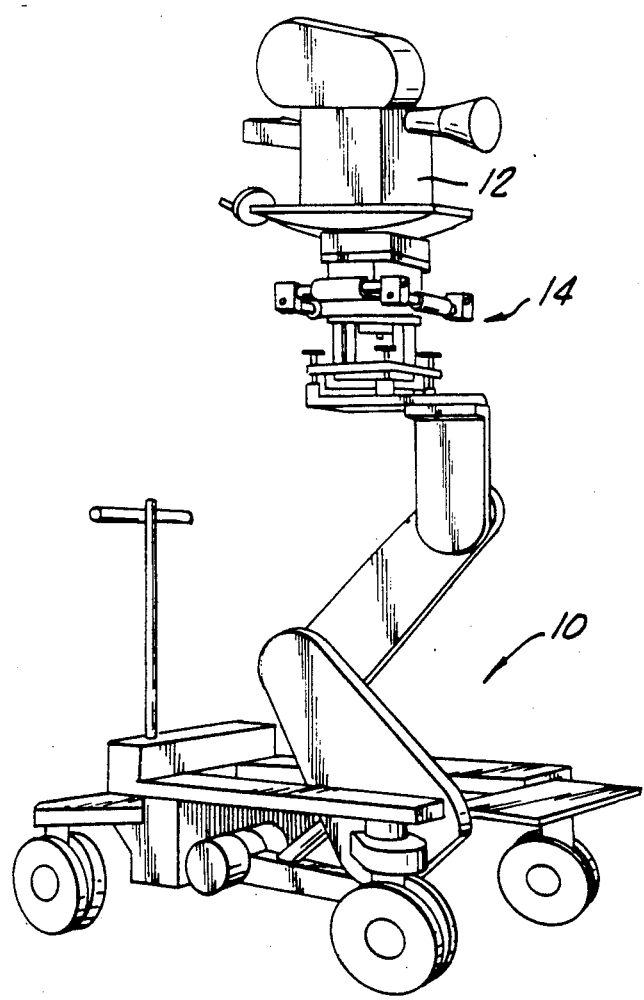
FIG. 1 is a perspective view of a motion picture camera mounted upon the isolator of the invention, and supported on an extendable arm of a camera dolly.

Turning in detail to the drawings, as shown in FIG. 1, a motion picture camera 12 is secured to the isolator 14 positioned on a camera dolly 10.

Figure 2:
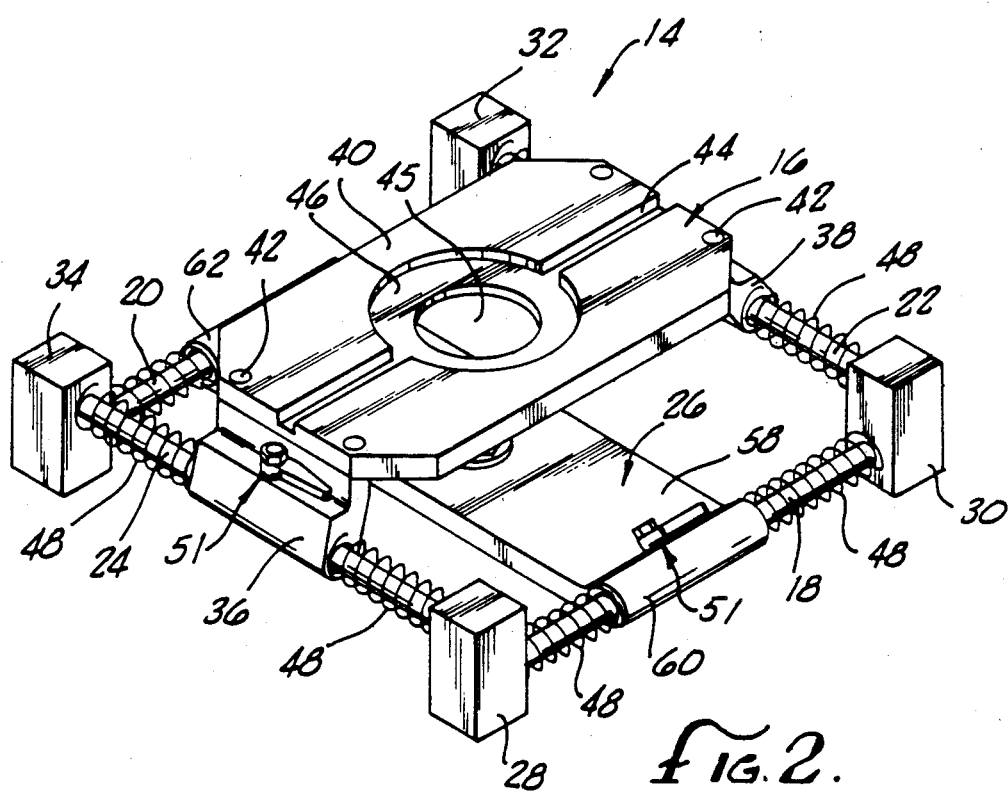
FIG. 2 is a perspective view of the isolator of the invention.

With reference to FIG. 2, the isolator 14 includes a mounting plate assembly 16 having left and right journal or ferrule arms 38 and 36, respectively. A mounting plate 40 is secured to ferrule arms 36 and 38 with fasteners 42. The mounting plate 40 has a slot 44 extending outwardly to the sides of the plate 40 from a counterbore 46 concentric with a central opening 45 through the plate 40.

Passing through the ferrule arms 36 and 38 are right and left longitudinal guide rails 24 and 22, respectively. The ends of guide rails 24 and 22 are joined to connecting blocks 28, 30, 32 and 34. Centering compression springs 48 are positioned around the guide rails 22 and 24, in between the ferrule arm 36 and the connecting blocks 34 and 28, and similarly in between ferrule arm 38 and connecting blocks 32 and 30. The compression springs 48 are made of stainless steel coiled wire, preferably 0.054 inch diameter, and with a spring constant adjusted to enable the springs 48 to exert centering spring forces on the mounting plate assembly 16.

Front and rear lateral guide bars 18 and 20 extend in between connecting blocks 28, 30, 32 and 34. A support plate assembly having front and rear ferrules 60 and 62, respectively, is slidably mounted on the guide bars 18 and 20, with the guide bars passing through the ferrules 60 and 62. Compression springs 48 are disposed around the guide bars 18 and 20 in between the ferrule 60 and connecting blocks 28 and 30, and similarly, between ferrule 62 and connecting blocks 32 and 34.

Figure 3:
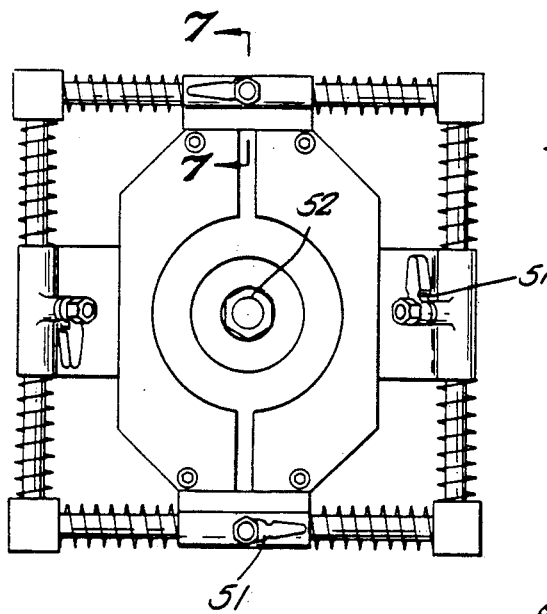
FIG. 3 is a plan view of the isolator of FIG. 2.
Figure 4:
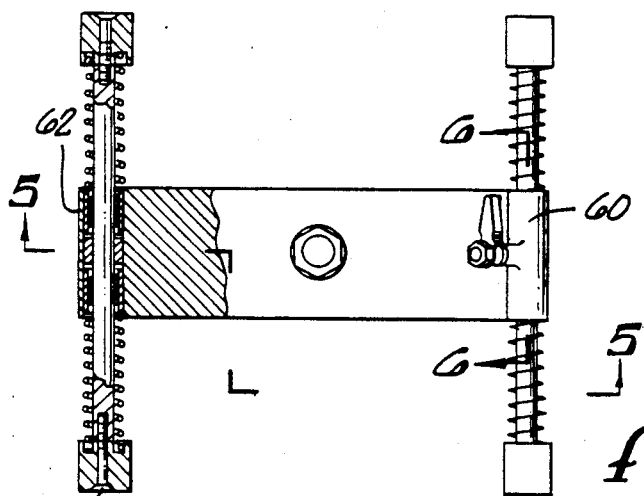
FIG. 4 is a plan view in part section of the support plate and guide bars of the isolator of FIG. 2.
Figure 7:
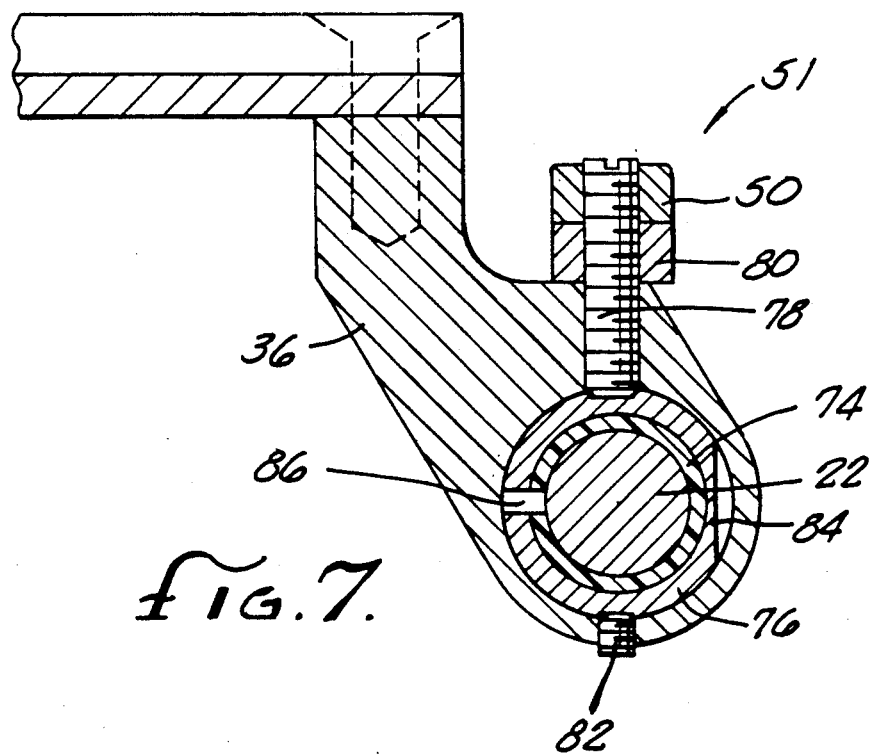
FIG. 7 is a section view of an adjustable friction clamp.

With reference to FIGS. 3, 4 and 7, each of the ferrule arms 36 and 38 and ferrules 60 and 62 has a friction clamp assembly 51 for adjusting the amount of sliding friction. With specific reference to FIG. 7, the friction clamp assembly 51 includes a friction clamp lever 50 secured to a drive stud 78 which threadably engages a boss 80. The end of the drive stud 78 engages a metallic clamp band 76 substantially surrounding guide bars 18 and 20 and guide rails 22 and 24. The clamp band 76 has a relieved section 84. A sleeve 74 is positioned in between the clamp band 76 and the guide rails and guide bars. The sleeve 74 is a teflon-graphite-brass material having a low coefficient of friction and having the characteristic of not sticking or binding to adjoining metal surfaces. The sleeve 74 is also slotted in the manner of the clamp band 76. A set screw 82 engages the clamp band 76 at a position opposite to the drive stud 78 for alignment purposes.

Figure 5:
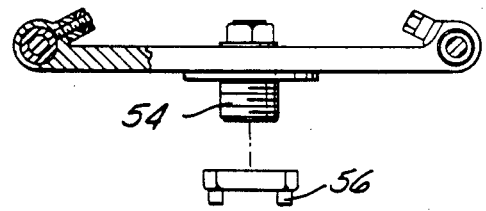
FIG. 5 is an end view in part section of the support plate and guide bars of FIG. 4.

Referring to FIG. 5, the support plate assembly 26 is attachable to a mounting bracket 56 of the dolly 10 via a platform stud 54.

Figure 6:
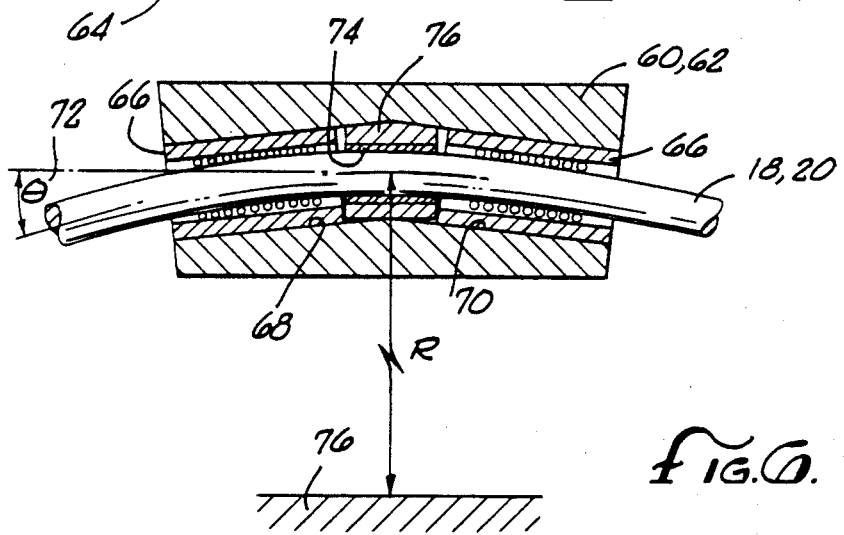
FIG. 6 is a schematic illustration of a guide bar passing through the support plate with the curvature of the guide bar exaggerated for illustration purposes.

As shown in FIG. 6, the lateral guide bars 18 and 20 each have a slight radius of curvature such that the ends of the bars adjoining the connecting blocks are closer to the floor 76 or than the center of the lateral guide bars. This radius of curvature, which is greatly exaggerated for purposes of illustration in FIG. 6, is preferably in the range of from 36 to 148 inches. In contrast, the longitudinal guide rails 22 and 24 are straight. The ferrules 60 and 62 have bores 68 and 70 extending therethrough at an angle to one another. The angle Θ formed by the longitudinal axes of the bores 68 and 70 and the horizontal axis 72 is 0.721 degrees when R equals 95 inches and 1.914 degrees when R equal 36 inches.

Also, as shown in FIG. 6, within the ferrules 60, 62 are spaced apart self-aligning (Thompson Super-12) ball bushings 66 which provides sliding bearing surfaces against the guide bars 18 and 20. For clarity the friction clamp 51 is not illustrated in FIG. 6.

In operation, the isolator acts to absorb shock and vibration as the dolly 10 rolls over the floor surface 76 which generally includes imperfection which, without the isolator 14 would result in shocking or jarring of the camera 12. The isolator 14 allows the mounting plate 40 freedom to move both laterally and longitudinally to absorb shock and vibration, without imparting sudden movement to the camera, by virtue of the inertia of the mounting plate assembly 16 and the inertia of the camera.

Typically, as the dolly rolls over the floor 76, the direction of the shock and vibration mechanical impulses generated is laterally on a radius. The particular radius and the direction of these impulses is a function of several variables, including the tire tread dimensions of the dolly, the amplitude or dimension of the bump or hole in the floor surface 76, and the structural stiffness and flexure characteristics of the dolly structure. The direction of the dolly wheels as the bump or hole is encountered may also effect the radius.

An approximately 84 inch radius guide bar accommodates the movement for impulses which are common to motion picture camera dollies such as the PEEWEE dolly and HYBRID dolly both manufactured by Leonard Studio Equipment, Inc., North Hollywood, Calif.

By providing the lateral guide bars 22 and 24 with a radius of curvature, angulation of a camera mounted on the mounting plate 40 is avoided even for relatively large horizontal displacements resulting from components of shock impulses generated when the dolly wheels roll over a bump or hole. For exceptionally small dollies, the preferred radius of the guide bars would be substantially less. Conversely, a larger radius would be used for large crane dollies.

Experimental results reveal that it is preferable for the support plate assembly 26 to be mounted longitudinally on the dolly 10, i.e. parallel to the direction of most dolly moving shots, generally front and back. The longitudinal guide rails 22 and 24 are preferably straight because during acceleration of the dolly, the camera secured to the mounting plate 40 must not be allowed to angulate due to displacement on a curved guide rail. In addition, since the dolly is dimensionally longer in a longitudinal direction, i.e. from front to back, the longer wheel base reduces angulation when the camera is directed laterally or off to one side of the dolly. The straight longitudinal guide rails 22 and 24 absorb shock and vibration in the direction of the axis of the rails. This shock and vibration may be due to the impact of a dolly wheel rolling over a bump or hole, as previously described but it is especially common due to the lack of smooth pushing of the dolly by the dolly operator, a long-standing problem in the art.

When the isolator 14 is provided on a dolly 10 having pneumatic tires, the pneumatic tires effectively eliminate ordinary rolling shock and vibration in the vertical direction with the isolator 14 absorbing horizontal shock and vibration components, such that the camera 12 remains exceptionally steady. This enables the dolly-isolator-camera combination to be used in a wide range of circumstances and in many cases, eliminates the need to lay track for the dolly to roll on to provide adequate smoothness.

While the support plate assembly 26 and the mounting assembly 16 are ordinarily allowed to slide freely on the lateral guide bars 18 and 20 and longitudinal guide rails 22 and 24, respectively, in certain instances, (e.g. with an exceptionally heavy camera 12), it may be advantageous to increase the sliding frictional forces using the friction clamp assemblies 51. By turning the clamp lever 50, as shown in FIG. 7, the clamp band 76 and underlying sleeve 74 are compressed against the guide rails 22 and 24 or the guide bars 18 and 20. The increase in the normal force at the interface between the sleeve 74 and guide rails 22 and 24 or guide bars 18 and 20 increases the amount of friction present. When fully engaged, the friction clamp assemblies 51 provide sufficient clamping force to prevent any sliding movement.

While embodiments and applications of this invention have been shown and described, it would be apparent to those skilled in the art that many more modifications are possible without departing from the inventive concepts herein. The invention, therefore is not to be restricted except in the spirit of the appended claims.

What is claimed:

1. A vibration and shock isolator comprising:
   a support plate assembly having at least one ferrule;
   at least one lateral guide bar passing through said ferrule, said guide bar having a radius of curvature in a plane perpendicular to the plane of said support plate assembly; and
   lateral biasing means for biasing said support plate towards a lateral center position on said guide bar.

2. The isolator of claim 1 further comprising a mounting plate assembly having at least one ferrule arm, and at least one longitudinal guide rail for supporting said mounting plate assembly disposed perpendicular to said lateral guide bar, said longitudinal guide rail passing through said ferrule arm; and longitudinal biasing means for biasing said mounting plate assembly towards a center longitudinal position.

3. An apparatus for isolating a platform moving over a surface from mechanical shock and vibration comprising:

a support plate assembly defining a support plate plane and having first and second ferrules disposed at opposite ends thereof;
first and second guide bars slidably extending through said first and second ferrules, respectively, said first and second guide bars having a radius of curvature in a plane perpendicular to the support plate plane;
first and second guide rails having ends linked to said first and second guide bars;
a mounting plate having first and second ferrule arms slidably mounted respectively on said first and second guide rails;
guide bar biasing means for biasing said support plate towards a support plate center position; and
guide rail biasing means for biasing said mounting plate towards a mounting plate center position.

4. The apparatus of claim 3 further comprising means for adjusting sliding friction between at least one of said ferrules and the guide bar extending there through.

5. The apparatus of claim 3 wherein said guide bar biasing means comprises first and second pairs of compression springs positioned around said first and second guide bars, respectively, with the springs of said first and second pairs disposed on opposite sides of said first and second ferrules, respectively.

6. The apparatus of claim 3 further comprising blocks joining the ends of said guide bars to the ends of said guide rails.

7. The apparatus of claim 3 wherein said radius of curvature is between 36 and 144 inches.

8. The apparatus of claim 4 wherein said means for adjusting friction comprises a lever fixed to a drive stud threadably engaged through a boss, a clamp band overlying a friction sleeve partially surrounding said guide bar, said stud having an end engageable to said clamp band, such that actuation of said lever causes said stud end to reversibly clamp said band and sleeve around said guide bar.

9. The apparatus of claim 8 wherein said clamp band includes a slot and a relieved section opposite to said slot.

10. The apparatus of claim 3 further comprising first and second pairs of spaced apart ball bushings disposed within said first and second ferrules and surrounding said first and second guide bars, respectively.

11. The apparatus of claim 3 wherein said mounting plate has a centrally located opening, a counterbore concentric to the opening, and opposing slots extending outwardly from said counterbore.

12. A vibration and shock isolator for use with a dolly comprising:

a front lateral guide bar having left front and right front connecting blocks at the ends thereof;
a rear lateral guide bar having left rear and right rear connecting blocks at the ends thereof;
a left guide rail joining said left front and left rear connecting blocks;
a right guide rail joining said right front and right rear connecting blocks;
a support plate slidably attached to said guide bars;
support plate biasing means for biasing said support plate to a center position on said guide bars;
a mounting plate slidably attached to said guide rails;
mounting plate biasing means for biasing said mounting plate to a center position on said guide rails;
said support plate disposed in between the dolly and said mounting plate; and
said guide bars being curved such that they form an arc between said connecting blocks, with the center of said guide bars being nearer to said mounting plate than the ends of said guide bars.

13. The isolator of claim 12 wherein said support plate biasing means comprises compression springs disposed on said guide bars in between said support plate and each connecting block.

14. The isolator of claim 12 wherein said guide bars and said guide rails are round.

15. The isolator of claim 12 wherein said guide bars have a radius of curvature of approximately 84 inches.

16. The isolator of claim 12 wherein each ferrule has first and second bores extending from first and second ends of said ferrule through to a center point of said ferrule, said first and second bores having longitudinal axes intersecting at an angle.

17. An apparatus for isolating a platform moving over a surface from mechanical shock and vibration comprising:

a support plate assembly defining a support plate plane and having first and second ferrules disposed at opposite ends thereof;
first and second guide bars slidably extending through said first and second ferrules, respectively, said first and second guide bars having a radius of curvature in a plane perpendicular to the support plate plane;
first and second guide rails having ends linked to said first and second guide bars at connecting blocks;
a mounting plate having first and second ferrule arms slidably mounted respectively on said first and second guide rails;
guide bar biasing means for biasing said support plate towards a support plate center position; and
guide rail biasing means for biasing said mounting plate towards a mounting plate center position.

18. An apparatus for isolating a platform moving over a surface from mechanical shock and vibration comprising:

a support plate assembly defining a support plate plane and having first and second ferrules disposed at opposite ends thereof;
first and second guide bars slidably extending through said first and second ferrules, respectively, said first and second guide bars having a radius of curvature in a plane perpendicular to the support plate plane;
first and second guide rails having ends linked to said first and second guide bars;
a mounting plate having first and second ferrule arms slidably mounted respectively on said first and second guide rails;
guide bar biasing means for biasing said support plate towards a support plate center position; and guide rail biasing means for biasing said mounting plate towards a mounting plate center position; and means for adjusting sliding friction between at least one of said ferrules and the guide bar extending therethrough including a lever fixed to a drive stud threadably engaged through a boss, a clamp band overlying a friction sleeve partially surrounding said guide bar, said stud having an end engageable two said clamp band, such that actuation of said lever causes said stud end to reversibly clamp said band and sleeve around said guide bar.

19. The apparatus of claim 18 wherein said clamp band includes a slot and a relief section opposite to said slot.

* * * * *